Figure 1A:
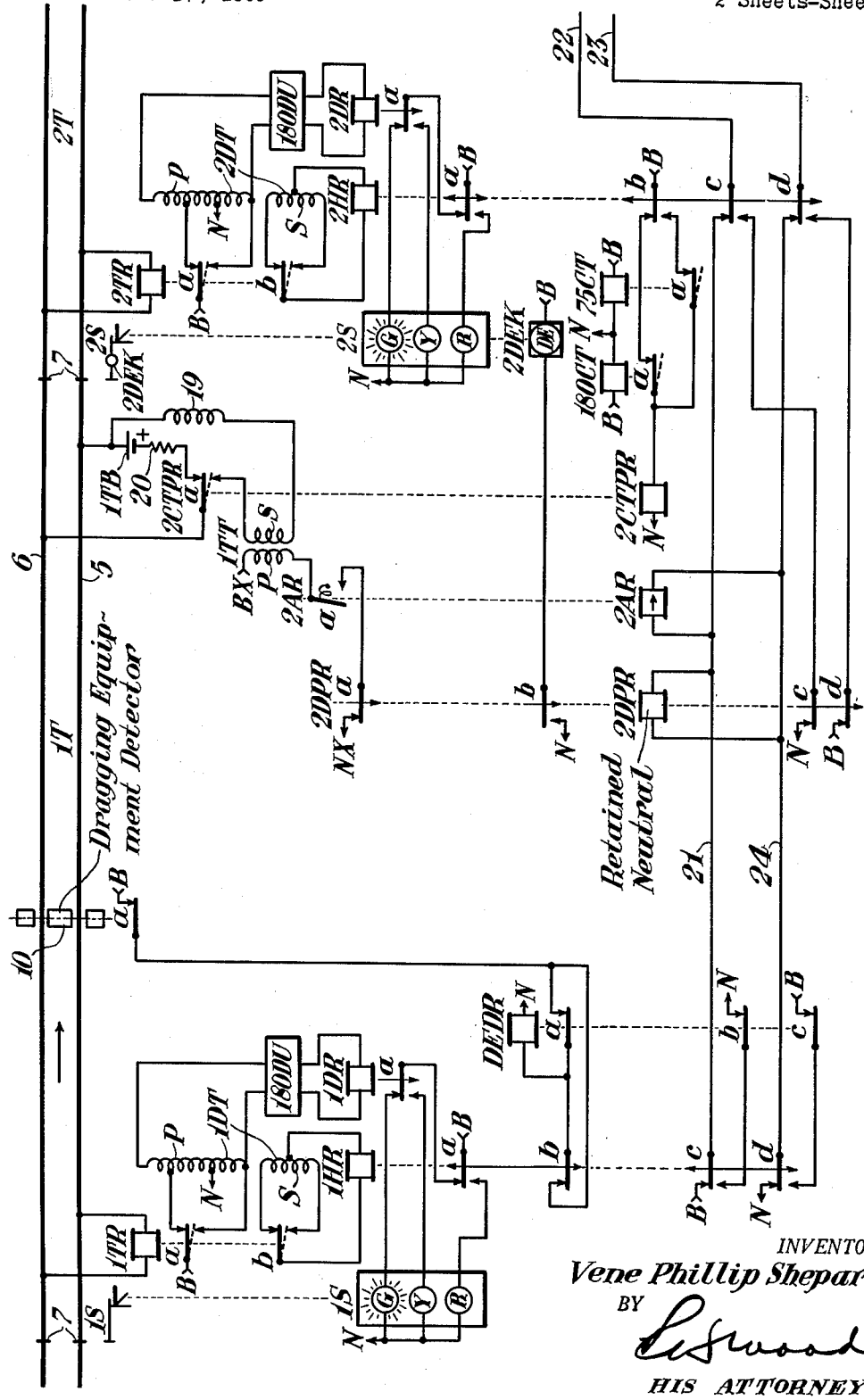

Oct. 25, 1955 — V. P. SHEPARDSON — 2,721,934
DRAGGING EQUIPMENT DETECTOR SYSTEM
Filed Feb. 17, 1951 — 2 Sheets-Sheet 1

INVENTOR.
Vene Phillip Shepardson
BY
HIS ATTORNEY

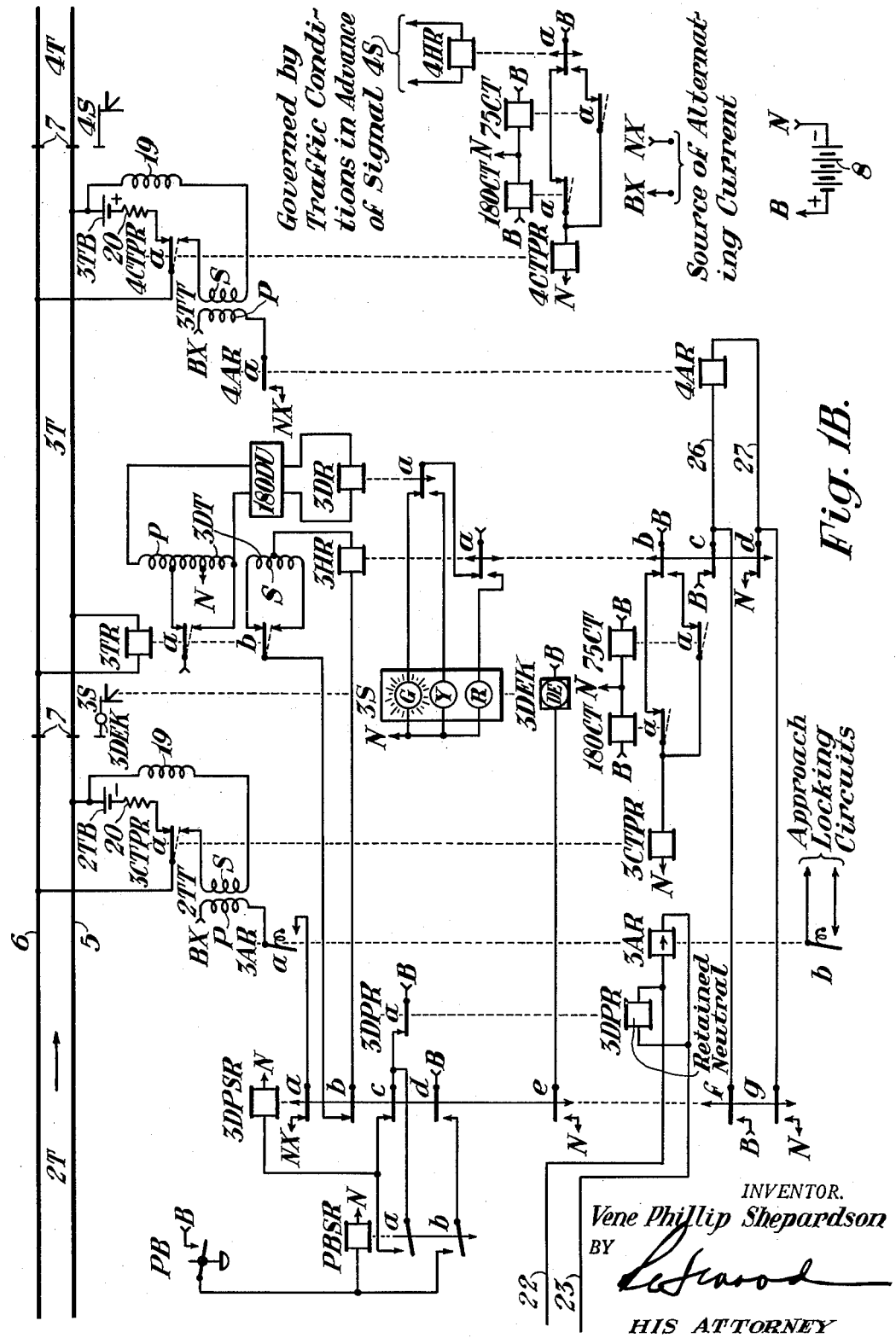

United States Patent Office 2,721,934
Patented Oct. 25, 1955

2,721,934

DRAGGING EQUIPMENT DETECTOR SYSTEM

Vene Phillip Shepardson, Richmond, Va., assignor to Westinghouse Air Brake Company, a corporation of Pennsylvania Application February 17, 1951, Serial No. 211,535

6 Claims. (Cl. 246—219)

My invention relates to dragging equipment detector systems for railroads, and more particularly to circuits for use in connection with self-restoring type dragging equipment detectors which detect the presence of objects dragging or hanging from passing vehicles.

The present invention is an improvement upon the dragging equipment detector system for railroads described and claimed in the copending application for Letters Patent of the United States, Serial No. 193,063, filed October 31, 1950, by James E. McMahon for Dragging Equipment Detector System, the two applications being of common ownership.

A dragging equipment detector is used principally in the rear of locations such as switches, crossovers, tunnels, bridges, interlocking plants and the like where damage and derailment may occur due to the presence of objects dragging or hanging from passing vehicles. Suitable signal indication means are also provided in the rear of such locations, and these indication means are controlled by the detectors in a manner to provide an indication when the dragging equipment detector has been actuated. Thus, when the engineman on a passing train observes an aspect which indicates that the dragging equipment detector has been actuated, the train can be brought to a stop, repairs can be made or other appropriate action taken, and the train can then proceed without danger of damage or derailment resulting from the dragging equipment.

Many of the previous dragging equipment detector systems employed frangible detector bars which were arranged to be broken by hanging or dragging equipment on passing vehicles. The detector bars were a part of a series electrical circuit which governed various signal indication means. Thus, when the detector bars were broken, the series circuit was opened thereby causing the signal indication means to display aspects indicating that the dragging equipment detector had been actuated. After the frangible detector bars were broken it was necessary to replace them in order to restore the various signal indication means to their normal position. This replacement was costly because it required that a signal maintainer be called out to replace the broken bars with new ones.

The present invention is particularly suitable for, although in no way limited to, use in connection with a dragging equipment detector of the type shown and described in the copending application for Letters Patent of the United States, Serial No. 146,098, filed on February 24, 1950, by Kenneth J. J. McGowan and R. A. Woods for Self Restoring Dragging Equipment Detectors now Patent No. 2,662,973, issued December 15, 1953. This detector comprises upstanding detector plates supported on a shaft between the rails, and arranged so as to be deflected when struck by an object that is hanging or dragging from passing vehicles. The detector plates are biased to their normal upright position, and accordingly when they are deflected they return to their upright position as soon as the dragging object clears the detector. The shaft which supports the plates is operatively connected with a contact which is arranged to be normally closed when the detector plates are in their upright position, and to be opened when the detector plates are deflected. Therefore, when such a detector is used it becomes necessary to provide signal control circuits which are governed by the momentary opening of the contact associated with the dragging equipment detector and which circuits will function to cause the signal means to display aspects indicating that the dragging equipment detector has been actuated after the dragging object has cleared the detector.

Accordingly, it is an object of my invention to provide improved circuits to be used with a self-restoring type of dragging equipment detector which will function to cause various signal means to display aspects indicating that the dragging equipment detector has been actuated by an object dragging or hanging from a train, but which will not function in response to malicious or inadvertent actuation of the detector by trespassers or unauthorized persons.

It is a further object of my invention to provide circuits to be used with self-restoring dragging equipment detectors to cause various signal means to display aspects indicating that the dragging equipment detector has been actuated by an object dragging or hanging from a train, the control of the signal means being such that the signals will display their normal aspects as soon as the train has progressed more than a predetermined distance beyond the dragging equipment detector.

Another object of my invention is to provide circuits to be used with self-restoring dragging equipment detectors to cause various signal means to display aspects indicating that the dragging equipment detector has been actuated, which circuits may be completed over a conducting path which is used for other circuits, such as approach control circuits.

According to my invention a self-restoring type dragging equipment detector is located adjacent a stretch of track in the rear of a wayside signal. The contact of this detector controls a stick circuit which includes the winding of a detector relay and circuit means governed by the relay in its picked up position. A shunt circuit is provided across the circuit means governed by the relay in its picked up position, which includes circuit means governed by the presence or absence of vehicles in the stretch of track proximate the location of the dragging equipment detector. Thus, if no vehicles are occupying the stretch of track proximate the location of the dragging equipment detector, and the dragging equipment detector is actuated to open its contact, the relay will be momentarily deenergized and when the dragging equipment detector closes its contact after having been actuated, the relay is energized over the shunt circuit. However, when vehicles are occupying the stretch of track proximate the location of the dragging equipment detector, and the dragging equipment detector is actuated to open its contact, the relay will be deenergized and will remain deenergized until no vehicles are occupying the stretch of track proximate the location of the dragging equipment detector. Circuits controlling the aspect displayed by various wayside signals, as well as various signal indication means which are intended to display aspects indicating that the dragging equipment detector has been actuated, are governed by means of the relay in its deenergized position and circuit means governed by the presence or absence of vehicles in the stretch of track proximate the location of the dragging equipment detector. Furthermore, these circuits may be carried over existing line wires which provide approach control indications so that it is not necessary to provide additional line wires.

Other objects and characteristic features of my invention will become apparent as the description proceeds.

I shall describe one form of railway signaling system embodying my invention, and shall then point out the novel features thereof in claims.

In the accompanying drawings, Figs. 1a and 1b when placed end to end with Fig. 1a at the left and Fig. 1b at the right comprise a diagrammatic view illustrating the track plan and wayside circuits and apparatus for one form of railway signaling system embodying my invention.

Referring to the drawings, the reference characters 5 and 6 designate the track rails of a stretch of railway track over which traffic normally moves in the direction indicated by the arrow, that is, from left to right. The track rails are divided, by means of insulated joints 7, to form track sections 1T, 2T, 3T and 4T.

Each track section is provided with a coded track circuit including a code following track relay, such as 2TR, connected across the rails at the entrance end of the section, and a track battery, such as battery 2TB, located at the exit end of the section. The supply of energy from the track battery to the code following track relay over the rails of the section is governed by a code transmitting relay, such as relay 3CTPR, the contacts of which are operated at various code rates, such as, for example, 75 or 180 times per minute. The recurrent operation of the contacts of the code following track relay causes coded energy to be supplied to decoding apparatus which in response thereto controls a wayside signal associated therewith in a manner to be subsequently explained.

Each wayside signal is located adjacent the entrance end of the associated track section and is designated by the reference character S with a prefix corresponding to the signal location. Each signal as here shown is of the type commonly known as a color-light signal having a green lamp G, a yellow lamp Y, and a red lamp R, which lamps when lit indicate "clear," "approach, prepare to stop at next signal," and "stop," respectively.

Associated with the signals are a plurality of relays which will be described in detail hereinafter. Each of these relays is identified by a characteristic letter or combination of letters, having the same prefix as the prefix for the reference character of the signal with which it is associated. For example, the relays associated with signal 2S are designated 2HR, 2DR, etc.

Energy for the operation of the apparatus other than the track circuits is furnished by suitable sources of direct current and alternating current. The source of direct current is here shown as a battery 8, the positive and negative terminals of which are designated by the reference characters B and N, respectively. The source of alternating current, not shown, is provided with terminals designated by the reference characters BX and NX.

The equipment is shown in its normal condition which it assumes when the stretch of railway track is vacant. At this time energy of 180 code frequency is supplied to the rails of the various track sections from the track batteries by the recurrent operation of the contacts of the code transmitting relays, and the green lamps of signals 1S, 2S, 3S and 4S are lit thereby providing "clear" indications.

In the coded track circuit system as shown herein, the coded currents are generated by code transmitters designated 180CT and 75CT at the various locations. These code transmitters are energized continuously and operate their contacts periodically at a rate of 180 or 75 times per minute, respectively, to periodically operate a code transmitting relay such as the previously referred to relay 3CTPR, by which coded energy of the selected frequency is supplied to the track rails. This coded energy controls code responsive apparatus at the different signal locations. The apparatus associated with the different track sections is substantially similar, and its operation will be understood from the following description of the apparatus associated with the track section 2T.

Referring to track section 2T, it will be seen that energy is supplied by the track battery 2TB over the rails of track section 2T to the winding of the code following track relay 2TR. As will be pointed out hereinafter this energy is coded at 180 or 75 times per minute depending upon traffic conditions in advance, and it follows therefore that relay 2TR will at times operate its contacts at 180 times per minute and at other times, at 75 times per minute. The periodically operating contacts of the code following relays are distinguished from those of the conventional quick acting type relays by dotted lines indicating the alternative position of the contacts. When a train is occupying track section 2T, the wheels and axles of the train shunt rails 5 and 6 so that no coded energy will be supplied to the winding of the code following track relay 2TR connected across the rails at the entrance end of track section 2T, and consequently the contacts of relay 2TR will be in their released position.

When relay 2TR is periodically operating its contacts, contact $a$ alternately completes energizing circuits for the lower half and the upper half of the primary winding P of a decoding transformer 2DT. As a result, current is induced in the secondary winding S of transformer 2DT, which current is mechanically rectified by contact $b$ of relay 2TR and supplied to the winding of a code detecting relay 2HR which is slow in both picking up and releasing its contacts. The contacts of the slow acting relays are distinguished from those of the conventional quick acting type relays by the vertical arrows thereon. The direction of the arrow heads indicates the direction in which the relay is slow in operating its contacts, that is, a downwardly pointing arrow head indicates that the relay is slow in releasing its contacts, and a double headed arrow indicates that the relay is slow in both releasing and picking up its contacts. It will be seen therefore that the relay 2HR will be energized to close its front contacts and open its back contacts whenever the track relay 2TR is following code. Whenever track section 2T is occupied by a train and track relay 2TR is not following code, code detecting relay 2HR releases its contacts, and accordingly it will be seen that relay 2HR is a conventional traffic responsive relay in that it operates its contacts according as track section 2T is occupied or unoccupied. Also, the primary winding P of transformer 2DT is connected to an autotransformer winding that supplies code frequency energy to a decoding unit 180DU which is of a type well known in the art. The decoding unit 180DU is constructed and arranged so that it will supply energy of a value sufficient to pick up the contacts of a slow release "clear" control relay 2DR when and only when the frequency of the energy supplied to the decoding unit from transformer 2DT is of the order of 180 cycles per minute. Accordingly, relay 2DR will be energized when and only when the code following track relay 2TR is responding to 180 code.

The circuits governing the aspect displayed by signal 2S are controlled by the code detecting relay 2HR and the "clear" control relay 2DR. When the track relay 2TR is responding to 180 code, the contacts of both relay 2HR and relay 2DR will be picked up as previously described, thereby establishing a circuit which may be traced from terminal B, through front contact $a$ of relay 2HR, front contact $a$ of relay 2DR, and the green lamp G of signal 2S to terminal N, so that signal 2S will then display a green aspect indicating "clear." When, however, the track relay 2TR is responding to the 75 code, the contacts of relay 2HR will be picked up and the contacts of relay 2DR will be released. Under these conditions a circuit will be established which may be traced from terminal B, through front contact $a$ of relay 2HR, back contact $a$ of relay 2DR, and the yellow lamp Y of signal 2S to terminal N, and signal 2S will therefore display a yellow aspect indicating "approach." It will also be seen that when the track relay is not responding to a code rate, that is, receiving no energy or insufficient energy to operate its contacts, the contacts of both relays 2HR and 2DR will be released, and under these conditions a circuit will be completed which may be traced from terminal B, through back contact a of relay 2HR, and the red lamp R of signal 2S to terminal N so that signal 2S displays a red aspect indicating "stop."

The circuits governing the frequency of the coded energy supplied to the track rails of track section 2T are controlled by the code detecting relay 3HR which is similar in its operation and functions to relay 2HR described above. When signal 3S displays a green aspect indicating "clear," as shown in Fig. 1B, the contacts of relay 3HR are picked up thereby establishing a circuit which may be traced from terminal B, over front contact b of relay 3HR, contact a of code transmitter 180CT, and through the winding of the code transmitting relay 3CTPR to terminal N so that the contacts of relay 3CTPR are recurrently operated at a rate of 180 times per minute. When signal 3S displays a yellow aspect indicating "approach" the contacts of relay 3HR will still be picked up so that the contacts of relay 3CTPR will continue to be operated at a rate of 180 times per minute. When signal 3S displays a red aspect indicating "stop," a circuit will then be completed which may be traced from terminal B, over back contact b of relay 3HR, contact a of code transmitter 75CT, and the winding of the code transmitting relay 3CTPR to terminal N. Under these conditions the contacts of relay 3CTPR will be recurrently operated at a rate of 75 times per minute.

The system also includes approach controlled means for governing train carried cab signals or train control apparatus. These means comprise a source of alternating current which becomes connected to the rails of each track section when a train enters the section, and which is periodically interrupted or coded at the same rate as the direct current energy which controls the wayside signals. The coded alternating current flowing in the track rails cooperates with a receiver mounted on the train in inductive relation to the rails, to induce in the receiver an electromotive force of the frequency and code rate of the rail current. The received electromotive force is used to operate a train carried code following relay which in turn governs train carried controlling devices or train carried indication means through decoding apparatus that is selectively responsive to the code rate at which the relay is operated. Normally the train carried indication means provide the same indication on the train that is displayed by the wayside signals. It should be noted that when no coded alternating current energy is being received by the receiver, the train carried controlling devices or indication means operate to their most restrictive condition. Such train carried signal systems are well known in the art, and a detailed description is therefore believed to be unnecessary. One form of cab signal system which will operate in the manner just described is described in Letters Patent of the United States No. 1,986,679, issued January 1, 1935, to L. V. Lewis.

The supply of the alternating current train control energy to the track rails of track section 2T is governed by an approach relay 3AR. This relay, as here shown, is a polar biased relay having contacts a and b. When the winding of the relay is energized by current flowing from the positive terminal B, through the winding of the relay in the same direction as the direction of the arrow head thereon, to the negative terminal N, the contacts a and b of the relay operate to their left hand position. When the winding of the relay is deenergized, or when the winding of the relay is energized by a current flowing from the positive terminal B, through the winding of the relay in the direction opposite to the direction of the horizontal arrow head thereon, to the negative terminal N, the contacts a and b of the relay operate to their right hand position.

The winding of relay 3AR is normally supplied with current by a line circuit that may be traced from terminal B, through front contact c of relay 1HR, line wire 21, front contact c of relay 2HR, line wire 22, the winding of relay 3AR, line wire 23, front contact d of relay 2HR, line wire 24, and front contact d of relay 1HR, to terminal N. Since in the foregoing circuit the direction of current flow is from terminal B, through the winding of relay 3AR in the same direction as the direction of the arrow head thereon, to terminal N, contacts a and b of relay 3AR occupy their left hand position.

When contacts c and d of relay 1HR are released, the winding of relay 3AR will be supplied with current by the line circuit which may be traced from terminal B, through front contact c of relay DEDR, back contact d of relay 1HR, line wire 24, front contact d of relay 2HR, line wire 23, the winding of relay 3AR, line wire 22, front contact c of relay 2HR, line wire 21, back contact c of relay 1HR, and front contact b of relay DEDR to terminal N. Since under these conditions the direction of current flow will be from terminal B, through the winding of relay 3AR in the direction opposite to the direction of horizontal arrow head thereon, to terminal N, the contacts a and b of relay 3AR will occupy their right hand position. Furthermore, when contacts c and d of relay 1HR are released, and contacts b and c of relay DEDR are also released, no energy will be supplied to the foregoing line circuit including line wires 21, 22, 23 and 24, and the winding of relay 3AR, and contacts a and b of relay 3AR will then also occupy their right hand position.

When contacts c and d of relay 2HR are released, the winding of relay 3AR will be supplied with current by the line circuit which may be traced from terminal B, through front contact d of relay 2DPR, back contact d of relay 2HR, line wire 23, the winding of relay 3AR, line wire 22, back contact c of relay 2HR, and front contact c of relay 2DPR to terminal N. Since under these conditions the direction of current flow will be from terminal B, through the winding of relay 3AR in the direction opposite to the direction of the horizontal arrow head thereon, to terminal N, the contacts a and b of relay 3AR will occupy their right hand position. Furthermore, when contacts c and d of relay 2HR are released, and contacts b and c of relay 2DPR are also released, no energy will be supplied to the foregoing line circuit including line wires 22 and 23, and the winding of relay 3AR, therefore, contacts a and b of relay 3AR will occupy their right hand position.

In view of the foregoing, it will now be apparent that the contacts of relay 3AR will occupy their left hand position only when the contacts of both relay 1HR and 2HR are picked up, and the contacts of relay 3AR will occupy their right hand position when the contacts of either or both of relays 1HR and 2HR are released. Conventional approach locking circuits may be controlled over contact b of relay 3AR in any well known manner, however, since the approach locking circuits form no part of my invention their details are not shown on the drawing. It should be noted that approach relay 2AR is similar to relay 3AR and the winding of relay 2AR is connected to line wires 21 and 24. Accordingly, the contacts of relay 2AR will occupy their left hand or right hand position according as the contacts of relay 1HR are picked up or released.

A dragging equipment detector repeater relay 2DPR is connected to line wires 21 and 24 in multiple with approach relay 2AR and a dragging equipment detector repeater relay 3DPR is connected to line wires 22 and 23 in multiple with approach relay 3AR. Accordingly, energy is supplied to the windings of relays 2DPR and 3DPR under the same conditions described above for relays 2AR and 3AR, respectively. However, relays 2DPR and 3DPR are retained neutral relays, and, as is well known in the art, a retained neutral relay is a neutral relay which does not release its contacts upon a reversal of the current supplied to the winding of the relay provided that the reversal of current takes place in a predetermined short time interval. Thus, with the foregoing line wire circuits, when either relay 1HR or 2HR releases its contacts thereby reversing the direction of current flow through the windings of either relay 2DPR or 3DPR, these relays do not release their contacts. However, when the supply of energy to the windings of these relays is cut off, they will release their contacts after a short time interval.

It will be obvious to any one skilled in the art that a retained neutral relay is equivalent to the well-known combination comprising an ordinary neutral relay having its winding connected to the line circuit and a slow release relay having its winding energized by a circuit including a front contact of the neutral relay. With this combination the neutral relay will release its contacts and then pick them up again during a reversal of the current supplied to its winding, however, the slow release relay will not release its contacts during the short time interval that the contacts of the neutral relay are released.

When contact arm $a$ of relay 3AR is in its right hand position, an obvious circuit including front contact $a$ of relay 3DPSR is established for supplying alternating current energy to the primary winding P of track transformer 2TT. The secondary winding S of track transformer 2TT supplies suitable coded alternating current train control energy to the track rails over a circuit which may be traced from the upper terminal of secondary winding S of transformer 2TT, through back contact $a$ of the code transmitting relay 3CTPR to rail 6 at the exit end of track section 2T, and from the lower terminal of the secondary winding S of transformer 2TT, through the current limiting impedance 19 to rail 5 at the exit end of track section 2T. The rate at which this current is coded will depend of course upon the rate at which the contact $a$ of relay 3CTPR is recurrently operated which it will be remembered is 180 or 75 times per minute depending upon traffic conditions in advance. Suitable coded direct current energy for the operation of the track relay 2TR is supplied to the track rails by a circuit which may be traced from the positive terminal of the track battery 2TB, through the current limiting resistor 20, front contact $a$ of the code transmitting relay 3CTPR to rail 6 at the exit end of track section 2T, and from the negative terminal of the track battery 2TB to rail 5 at the exit end of track section 2T. Thus, with contact $a$ of relay 3CTPR recurrently operating at a code rate of either 75 or 180 times per minute, coded direct current energy is supplied to the track rails over front contact $a$ of relay 3CTPR, and when contact $a$ of relay 3AR is in its right hand position and contact $a$ of relay 3DPSR is picked up, coded alternating current energy is supplied to the track rails over back contact $a$ of relay 3CTPR.

From the foregoing description of the operation of signal 2S and the apparatus and circuits associated with track section 2T, the operation of the similar parts associated with track sections 1T and 3T will be readily understood. The slight differences between the circuits associated with the various track sections will be described in detail hereinafter.

A self-restoring type dragging equipment detector designated by the reference character 10 and having a normally closed contact $a$, is here shown located adjacent track rails 5 and 6 in track section 1T. The dragging equipment detector 10 may, for example, be of the type shown and described in the copending McGowan and Woods application, Serial No. 146,098, now patent No. 2,662,973 referred to hereinbefore.

Associated with the dragging equipment detector 10 is a dragging equipment detector relay DEDR. This relay is normally energized by a stick circuit which may be traced from positive terminal B, through contact $a$ of the dragging equipment detector 10, front contact $a$ of relay DEDR, and the winding of relay DEDR to negative terminal N. Relay DEDR is also at times energized by a pick-up circuit which may be traced from the positive terminal B, through contact $a$ of the dragging equipment detector 10, front contact $b$ of relay 1HR, and the winding of relay DEDR, to the negative terminal N. Thus, it will be seen that when the contacts of relay 1HR are picked up and contact $a$ of the dragging equipment detector 10 is momentarily opened, the dragging equipment detector relay DEDR will release its contacts and then pick up its contacts when contact $a$ of the dragging equipment detector 10 recloses. When the contacts of relay 1HR are released and contact $a$ of the dragging equipment detector 10 is momentarily opened, the dragging equipment detector relay DEDR will release its contacts and they will remain released until both contact $a$ of the dragging equipment detector 10 recloses and relay 1HR picks up its contacts.

In order to explain the operation of the apparatus as a whole, it will first be assumed that track sections 1T, 2T, 3T and 4T are all unoccupied, as shown, and that a train moves through the stretch of track from left to right without actuating the dragging equipment detector 10.

When the train moves past signal 1S and enters track section 1T, the wheels and axles of the train will shunt the supply of energy from the rails 5 and 6 to the winding of the code following track relay 1TR, and the code following operation of relay 1TR will therefore cease. Accordingly, relays 1HR and 1DR will release their contacts and signal 1S will display a red aspect indicating "stop." Also, when relay 1HR releases its contacts $c$ and $d$, energy of the proper polarity will be supplied to the windings of relays 2AR and 3AR causing them to operate their contacts to their right hand position as previously described, and alternating current train control energy coded at the rate of 180 times per minute minute will be supplied to the track rails at the exit ends of track sections 1T and 2T.

When the train moves past signal 2S and enters track section 2T vacating track section 1T, track relay 2TR will cease its code following operation and accordingly relays 2HR and 2DR will release their contacts. This will cause signal 2S to display a red aspect indicating "stop," and code transmitting relay 2CTPR to operate its contacts at a code rate of 75 times per minute so that 75 code will be supplied to the winding of relay 1TR. Accordingly, the contacts of relay 1HR will be picked up and the contacts of relay 1DR will remain released so that signal 1S will display a yellow aspect indicating "approach." Also, movable contact arm $a$ of relay 2AR will operate to its left hand position and coded alternating current energy will no longer be supplied to the track rails of section 1T. Since the contacts of relay 2HR are released, the movable contact arms of relay 3AR will remain in their right hand position and alternating current energy coded at the rate of 180 times per minute will be supplied to the track rails at the exit end of track section 2T.

When the train moves past signal 3S and enters track section 3T vacating track section 2T, track relay 3TR will cease its code following operation and accordingly relays 3HR and 3DR will release their contacts. This will cause signal 3S to display a red aspect indicating "stop," and code transmitting relay 3CTPR to operate its contacts at a code rate of 75 times per minute so that 75 code is supplied to the winding of relay 2TR. Accordingly, the contacts of relay 2HR will become picked up and the contacts of relay 2DR will remain released so that signal 2S will display a yellow aspect, and coded alternating current energy will no longer be supplied to the track rails of section 2T. Also, relay 2CTPR will now operate its contacts at a code rate of 180 times per minute so that the contacts of relay 1DR will become picked up and since the contacts of relay 1HR are already picked up signal 1S will display a green aspect indicating "proceed." As approach relay 4AR is here shown as a neutral relay the winding of which is usually energized by a circuit which may be traced from terminal B, through front contact c of relay 3HR, line wire 26, the winding of relay 4AR, line wire 27, and front contact d of relay 3HR to terminal N. However, since the contacts of relay 3HR will be released at this time, energy will no longer be supplied to the winding of relay 4AR and contact a of relay 4AR will be released so that alternating current train control energy coded at the rate of 180 times per minute will be supplied to the track rails 5 and 6 at the exit end of track section 3T.

By the symmetry of the circuits, it will now be seen that when the train moves past signal 4S and enters track section 4T vacating track section 3T, signal 4S will display a red aspect, signal 3S will display a yellow aspect, signal 2S will display a green aspect, signal 1S will display a green aspect, and coded alternating current energy will no longer be supplied to the track rails of section 3T.

It will now be assumed that a train which has entered section 1T has a dragging or hanging object which actuates the dragging equipment detector 10 as the train passes the detector. As was pointed out hereinbefore, when a train enters section 1T, the code following operation of relay 1TR will cease, relays 1HR and 1DR will release their contacts, signal 1S will display a red aspect indicating "stop," the movable contact arms of relays 2AR and 3AR will operate to their right hand position, and alternating current energy coded at the rate of 180 times per minute will be supplied to the track rails at the exit ends of tracks sections 1T and 2T. Now, the actuation of the detector 10 by the hanging object causes contact a of detector 10 to be momentarily opened, and since the contacts of relay 1HR are released, the winding of the dragging equipment detector stick relay DEDR becomes deenergized and relay DEDR releases its contacts. When relay DEDR releases under these conditions it remains released even though contact a of the detector 10 recloses, because both front contact b of relay 1HR and front contact a of relay DEDR are open.

When contacts b and c of the dragging equipment detector relay DEDR become released, the supply of energy to the line wire circuit including line wires 21, 22, 23 and 24 is cut off. Accordingly, the movable contact arms of relays 2AR and 3AR remain in their right hand position and the dragging equipment detector repeater relays 2DPR and 3DPR release their contacts.

When contact a of relay 2DPR is released, the supply of coded alternating current energy to the track rails at the exit end of track section 1T is cut off, and as a result, the train carried control devices or indication means on the train occupying track section 1T operate to their most restrictive condition.

When contact b of relay 2DPR is released, an obvious circuit including back contact b of relay 2DPR is established so that energy is supplied to the lamp of a dragging equipment indicator 2DEK. Indicator 2DEK is here shown located on the same signal mast as signal 2S, and when illuminated, indicates that the dragging equipment detector has been actuated.

When contact a of relay 3DPR is released, the winding of the dragging equipment detector repeater stick relay 3DPSR becomes deenergized. Relay 3DPSR is a slow pick up slow release relay, the winding of which is normally energized by a stick circuit which may be traced from terminal B, through front contact a of relay 3DPR, front contact c of relay 3DPR, and the winding of relay 3DPSR to terminal N. When contact a of relay 3DPR is released, the stick circuit for supplying energy to the winding of relay 3DPSR is interrupted and after a short time interval, such as one second, slow acting relay 3DPSR releases its contacts.

When relay 3DPSR releases its contacts, energy is supplied to the lamp of the dragging equipment indicator 3DEK over an obvious circuit including contact e of relay 3DPSR. Indicator 3DEK is similar to indicator 2DEK referred to above, and is here shown located on the same signal mast as signal 3S.

When relay 3DPSR releases its contacts, the circuit including front contact a of relay 3DPSR for supplying alternating current energy to the primary P of transformer 2TT is opened and accordingly coded alternating current energy is no longer supplied to the track rails of section 2T.

It will be apparent from an inspection of Fig. 1B that front contact b of relay 3DPSR is included in the circuit for supplying energy to the winding of relay 3HR. Therefore, when contact b of relay 3DPSR is released, the circuit for supplying energy to the winding of relay 3HR is interrupted, and relay 3HR releases its contacts even though the code following track relay 3TR is responding to code. When relay 3HR releases its contacts, signal 3S displays a red aspect and code transmitting relay 3CTPR operates its contacts at a code rate of 75 times per minute so that 75 code is supplied to the winding of relay 2TR. Accordingly, the contacts of relay 2DR become released and the contacts of relay 2HR remain picked up so that signal 2S displays a yellow aspect.

It will be remembered that normally when relay 3HR releases its contacts, energy is no longer supplied to the winding of relay 4AR, and relay 4AR releases its contacts. However, since at this time the dragging equipment detector 10 has been actuated and relay 3DPSR has released its contacts, when relay 3HR releases its contacts the winding of relay 4AR continues to be energized by a circuit which may be traced from terminal B, through back contact f of relay 3DPSR, line wire 26, the winding of relay 4AR, line wire 27, and back contact g of relay 3DPSR to terminal N.

In view of the foregoing it is now apparent that when objects hanging or dragging from a vehicle actuate the self-restoring dragging equipment detector 10, signal 3S is conditioned to display a red aspect, signal 2S is conditioned to display a yellow aspect, the dragging equipment indicators 2DEK and 3DEK are illuminated, and the train carried control devices or indication means on the train occupying track section 1T operate to their most restrictive condition. It will also be apparent that the preferable location for the dragging equipment detector 10 is in track section 1T in the rear of signal 2S such a distance that the end of a train will have passed over the detector when the front of the train is still some distance, say 2,000 feet, in the rear of signal 2S. Accordingly, the complete train is able to pass over the dragging equipment detector and during the time thereafter that the train is approaching signal 2S, the engineman on the train has ample opportunity to observe the aspects displayed by signal 2S and the dragging equipment indicator 2DEK, as well as the condition of any train carried train control devices or indication means. Thus, when the dragging equipment detector is actuated, the engineman on the train, upon recognizing the various conditions so established, will bring the train to a stop so that repairs can be made to the defective vehicles having dragging or hanging objects. Furthermore, the engineman on the train, upon recognizing the various conditions established due to the actuation of the dragging equipment detector, will bring the train to a gradual halt in the rear of signal 3S, rather than making an emergency application of train brakes while the train is moving through track section 1T.

When the train in being brought to a gradual halt in the rear of signal 3S, moves past signal 2S and enters track section 2T vacating track section 1T, track relay 2AR ceases its code following operation and accordingly the contacts of relays 2HR and 2DR are released. This causes signal 2S to display a red aspect and code transmitting relay 2CTPR to operate its contacts at a code rate of 75 times per minutes so that 75 code is supplied to the winding of relay 1TR. Accordingly, the contacts of relay 1HR are picked up and the contacts of relay 1DR remain released so that signal 1S displays a yellow aspect indicating "approach."

When relay 1HR picks up its contacts, the previously described circuit including front contact *b* of relay 1HR for energizing the winding of the dragging equipment detector relay DEDR is established so that relay DEDR picks up its contacts. Also, energy is being supplied to the line circuit including front contacts *c* and *d* of relay 1HR and line wires 21 and 24, so that relay 2AR operates its contact to its left hand position, and relay 2DPR picks up its contacts.

When relay 2AR operates its contact *a* to its left hand position, the circuit for supplying energy to the primary P of transformer 1TT remains open so that no coded alternating current energy is supplied to the track rails 5 and 6 of track section 1T.

When relay 2DPR picks up its contacts, the circuit for supplying energy to the lamp of the dragging equipment indicator 2DEK including back contact *b* of relay 2DPR is interrupted so that the lamp of indicator 2DEK is no longer illuminated.

When relay 2DPR picks up its contacts, and since the contacts of relay 2HR are released, energy will be supplied to the windings of relays 3DPR and 3AR over the line wire circuit including line wires 22 and 23 so that relay 3DPR picks up its contact and the contact of relay 3AR remains in its right hand position.

In view of the foregoing, it will be observed that when a train which has actuated the self-restoring dragging equipment detector 10, moves past signal 2S and enters section 2T vacating track section 1T, signals 3S and 2S are conditioned to display a red aspect indicating "stop," signal 1S is conditioned to display a yellow aspect indicating "approach," dragging equipment indicator 2DEK is extinguished, indicator 3DEK is still illuminated, and the train carried control devices or indication means on the train occupying track section 2T continues to operate to their most restrictive condition.

When the train has been brought to a stop in the rear of signal 3S and appropriate action has been taken so that the train is now in proper condition to move on through the stretch of track, it is desirable to extinguish the indicator lamp in the dragging equipment indicator 3DEK, and to "clear" signal 3S, that is, condition signal 3S to provide a green aspect indicating "clear." As has been pointed out hereinbefore, signal 3S and indicator 3DEK are governed by contacts *b* and *e* of relay 3DPSR, respectively, and the winding of relay 3DPSR is normally energized by a stick circuit including front contact *c* of relay 3DPSR. When relay 3DPSR has released its contacts, a pick-up circuit for energizing the winding of relay 3DPSR may be established by operating a push button PB. Push button PB may be located on the signal mast which supports signal 3S, or thereabouts, so that it can be readily operated by a member of the train crew.

When push button PB is depressed a pick-up circuit which may be traced from terminal B, through the contact of the push button PB, and the winding of the slow release push button stick relay PBSR to terminal N is completed thereby energizing the winding of relay PBSR to pick up its contacts. When relay PBSR picks up its contacts a stick circuit which may be traced from terminal B, through back contact *d* of relay 3DPSR, front contact *b* of relay PBSR, and the winding of relay PBSR to terminal N is established so that the push button PB need only be momentarily depressed in order to energize and then hold relay PBSR energized.

When relay PBSR picks up its contacts, the winding of relay 3DPSR is energized by a pick-up circuit which may be traced from terminal B, through front contact *a* of relay 3DPR, front contact *a* of relay PBSR, and the winding of relay 3DPSR to terminal N. It will be remembered that relay 3DPSR is slow in picking up and releasing its contacts. Thus, when relay PBSR picks up its contacts to thereby establish the pick-up circuit for energizing the winding of relay 3DPSR, relay 3DPSR is slow in picking up its contacts and until relay 3DPSR picks up its contacts, the winding of relay PBSR remains energized over the foregoing stick circuit including back contact *d* of relay 3DPSR. However, since relay PBSR is slow in releasing its contacts, when relay 3DPSR in picking up its contacts opens the stick circuit including back contact *d* of relay 3DPSR for energizing the winding of relay PBSR, the contacts of relay PBSR remain picked up for a short time interval and the winding of relay 3DPSR continues to be energized through the circuit including contact *a* of relay PBSR during this short time interval. During this time interval relay 3DPSR picks up its contacts thereby completing the stick circuit including front contact *c* of relay 3DPSR for energizing the winding of relay 3DPSR so that the winding of relay 3DPSR continues to be energized after relay PBSR releases its contacts.

When relay 3DPSR picks up its contacts, the circuit including contact *b* of relay 3DPSR for energizing the winding of slow pick-up slow-release relay 3HR is reestablished, and since the code following track relay 3TR is responding to 180 code rate, relay 3HR picks up its contacts after a short time interval and signal 3S displays a green aspect.

Also when relay 3DPSR picks up its contacts, the circuit including back contact *e* of relay 3DPSR is opened so that energy is no longer supplied to the lamp of the dragging equipment indicator 3DEK.

Furthermore, when relay 3DPSR picks up its contacts, the circuit for energizing the primary P of transformer 2TT, including front contact *a* of relay 3DPSR and contact *a* of relay 3AR in its right hand position is reestablished and since contact *a* of relay 3CTPR is operating at a rate of 180 times per minute, alternating current energy coded at a rate of 180 times per minute is supplied to the track rails 5 and 6 of track section 1T.

When relay 3DPSR picks up its contacts, the circuit for supplying energy to the winding of relay 4AR and line wires 26 and 27 is interrupted when contacts *f* and *g* are picked up, and relay 4AR releases its contact. However, it will be remembered that when relay 3DPSR picks up its contacts, after a short time interval slow acting relay 3HR picks up its contacts. When relay 3HR picks up its contacts, the circuit for energizing the winding of relay 4AR, including front contacts *c* and *d* of relay 3HR, is reestablished and relay 4AR picks up its contact. During the time interval that the contact of relay 4AR is released, coded alternating current energy is supplied to the track rails 5 and 6 of track section 3T, but since track section 3T is unoccupied at this time, this operation is of no consequence.

In view of the foregoing it is now apparent that with the train occupying track section 2T after having actuated the dragging equipment detector located in track section 1T, operation of the push button PB results in causing all of the dragging equipment indicator lamps to be extinguished, and the signals at the entrance to the various track sections display aspects in the usual manner in accordance with traffic conditions. That is, the signals then display the same aspects, and the circuits associated with the stretch of track then function in the same manner as they would had the train been occupying track section 2T without having actuated the dragging equipment detector.

It should be pointed out that when the dragging equipment detector is located in the rear of a tunnel or bridge at some remote point, it will usually be desirable to locate the push button PB and the dragging equipment indicator 3DEK as described hereinbefore. However, it should also be pointed out that signal 3S may be the home signal of an interlocking plant and that conventional signal levers may also be used to control signal 3S. Accordingly, when the dragging equipment detector is actuated and relay 3DPSR releases its contacts, signal 3S would display a red aspect even through the towerman might operate the signal levers in an attempt to clear the signal. Under these conditions, the dragging equipment indicator 3DEK and the push button PB would preferably be located in the tower, so that when indicator 3DEK was illuminated the towerman would recognize that an approaching train would be stopping rather than proceeding through the interlocking. Furthermore, after an approaching train had stopped and then was ready to proceed, the towerman could depress the push button PB and thereby clear signal 3S.

After the push button PB has been actuated and the train moves past signal 3S, and enters track section 3T vacating track section 2T, the circuit operation and the aspects displayed by the various signals will be the same as previously described for this condition. Furthermore, the dragging equipment detector can now be actuated by a following train and the signals and indicators will again operate in the same manner as previously described.

Although I have herein shown and described only one circuit arrangement for carrying out my invention, it is to be understood that various changes and modifications may be made therein within the scope of the appended claims without departing from the spirit and scope of my invention.

Having thus described my invention, what I claim is:

1. In a dragging equipment detector system for a stretch of railway track, the combination comprising, a dragging equipment detector associated with said stretch, contact means controlled by said detector to be closed when and only when said dragging equipment detector is in its normal condition, a traffic responsive relay associated with said stretch, means for normally energizing said traffic responsive relay when and only when said stretch is unoccupied, first relay means having contacts which remain closed during a reversal of the polarity of the energizing current but which release a short time interval after said first relay means becomes deenergized, second relay means having contacts which become open when and only when said second relay means is energized by current of a given polarity, means governed by said traffic responsive relay in its energized condition for energizing said first and second relay means by current of said given polarity, means governed by said traffic responsive relay in its deenergized condition and said contact means for energizing said first and second relay means by current of the opposite polarity, wayside indication means controlled by said first relay means and train carried indication means controlled by said first and second relay means.

2. In a dragging equipment detector system for a stretch of railway track, the combination comprising, a dragging equipment detector associated with said stretch, contact means controlled by said detector to be closed when and only when said dragging equipment detector is in its normal condition, a traffic responsive relay associated with said stretch and having contacts that are closed in a first position or a second position according as said stretch is unoccupied or occupied, first relay means having contacts which remain closed during a reversal of the polarity of the energizing current but which open a short interval after said first relay means becomes deenergized, second relay means having contacts which become open when and only when said second relay means is energized by current of a given polarity, means governed by a contact of said traffic responsive relay in its first position for energizing said first and said second relay means by current of said given polarity, means governed by a contact of said traffic responsive relay in its second position and said contact means for energizing said first and second relay means by current of the opposite polarity, wayside indication means controlled by said first relay means, traffic governing wayside indication means also controlled by said first relay means and train carried indication means controlled by said first and second relay means.

3. In a dragging equipment detector system for a stretch of railway track, the combination comprising, a dragging equipment detector associated with said stretch, a detector relay, means for energizing said detector relay when and only when said dragging equipment detector is in its normal condition, a traffic responsive relay, means for normally energizing said traffic responsive relay when and only when said stretch is unoccupied, a retained neutral dragging equipment indication relay, a polar biased approach relay having contacts which become open only when said polar biased relay is energized by current of a given polarity, means governed by said traffic responsive relay in its energized condition for energizing said dragging equipment indication relay and said approach relay by current of said given polarity, means governed by said traffic responsive relay in its deenergized condition and by said detector relay in its energized condition for energizing said dragging equipment indication relay and said approach relay by current of the opposite polarity, train carried indication means controlled by said approach relay and wayside indication means controlled by said dragging equipment indication relay.

4. In a dragging equipment detector system for railroads, in combination, a stretch of railway track, a first relay, said first relay being associated with said stretch and having contacts that are closed in a first position or a second position according as said stretch of track is unoccupied or occupied, a dragging equipment detector located adjacent said stretch, a detector relay, means for energizing said detector relay when and only when said dragging equipment detector is in its normal condition, a dragging equipment indication relay, an approach relay having contacts which become open when and only when its winding is energized by current of a given polarity, means including a contact of said first relay in its first position for energizing said dragging equipment indication and approach relays by current of said given polarity, means including a contact of said first relay in its second position and a contact of said detector relay in its energized position for energizing said dragging equipment indication and approach relays by current of the opposite polarity, wayside indication means governed by contacts of said dragging equipment indication relay and train carried indication means governed by contacts of said dragging equipment indication relay and of said approach relay.

5. In a dragging equipment detector system for a stretch of railway track, the combination comprising, a dragging equipment detector associated with said stretch, a first relay, circuit means for energizing said first relay when and only when said dragging equipment detector is in its normal condition, a second relay associated with said stretch and having contacts that are closed in a first position when said stretch of track is unoccupied and closed in a second position when said stretch of track is occupied, a retained neutral dragging equipment indication relay, a polar biased approach relay having contacts which become open only when the winding of said approach relay is energized by current of a given polarity, means governed by a contact of said second relay in its first position for energizing the winding of said dragging equipment indication relay and the winding of said approach relay by current of said given polarity, means governed by a contact of said second relay in its second position and a contact of said first relay in its energized position for energizing the winding of said dragging equipment indication relay and the winding of said approach relay by current of the opposite polarity, wayside indication means controlled by said dragging equipment indication relay and train carried indication means controlled by contacts of said dragging equipment indication relay and of said approach indication relay.

6. In a dragging equipment detector system for a stretch of railway track, the combination comprising, a dragging equipment detector associated with said stretch, a first relay, circuit means for energizing said first relay when and only when said dragging equipment detector is in its normal condition, a second relay associated with said track and having contacts that are closed in a first position when said stretch of track is unoccupied and closed in a second position when said stretch of track is occupied, a retained neutral dragging equipment indication relay which retains its front contacts closed upon a reversal of the polarity of the current by which its winding is energized but which upon becoming deenergized releases its contacts, a polar biased approach relay which opens its front contacts and retains them open in response to current of only a given polarity supplied to its winding, circuit means governed by a contact of said second relay in its first position for energizing the winding of said dragging equipment indication relay and the winding of sad approach relay by current of said given polarity, circuit means governed by a contact of said second relay in its second position and a contact of said first relay in its energized position for energizing the winding of said dragging equipment indication relay and the winding of said approach relay by current of the opposite polarity, circuit means governed by a contact of said second relay in its second position and a contact of said first relay in its deenergized position for deenergizing the winding of said dragging equipment indication relay and the winding of said approach relay, and train carried indication means controlled jointly by said dragging equipment indication relay and by said approach relay.

References Cited in the file of this patent

UNITED STATES PATENTS

| | | |
|---|---|---|
| 2,063,336 | Post | Dec. 8, 1936 |
| 2,095,616 | Post | Oct. 12, 1937 |
| 2,581,108 | Jacobus | Jan. 1, 1952 |